3,658,910
LIQUID 2-HYDROXY-4-ALKOXYBENZO-
PHENONES
Ingenuin A. Hechenbleikner, Cincinnati, Ohio, assignor to
Carlisle Chemical Works, Inc., Reading, Ohio
No Drawing. Filed Feb. 11, 1970, Ser. No. 10,608
Int. Cl. C07c 49/82
U.S. Cl. 260—591
3 Claims

ABSTRACT OF THE DISCLOSURE

Liquid 2-hydroxy-4-alkoxybenzophenones are prepared where the alkoxy group is a mixture of random branched alkyl groups of 6–10 carbon atoms. They are useful as ultraviolet light stabilizers for polymers, e.g. vinyl chloride polymers and mönoolefin polymers.

---

The present invention relates to 2-hydroxy-4-alkoxybenzophenones.

It is known to prepare solid 2-hydroxy-4-octoxy-benzophenones wherein the octyl group is either n-octyl or 2-ethylhexyl. Such materials have been utilized as ultraviolet light stabilizers. Compounds of this type are shown in U.S. Pat. 2,861,105 and German Offenlegungsschrift 1,806,870. However, due to the fact that such products are solids they have certain inherent disadvantages.

It is an object of the present invention to prepare novel liquid 2-hydroxy-4-alkoxybenzophenones.

Another object is to use such alkoxy compounds as ultraviolet stabilizers for polymers.

An additional object is to prepare such stabilizers having greater compatibility with most resins than conventional solid n-alkoxy containing ultraviolet stabilizers.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing 2-hydroxy-4-alkoxybenzophenones of the formula

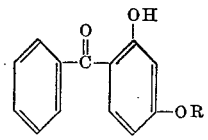

where R is a mixture of random branched alkyl groups having 6 to 10 carbon atoms and are of the "oxo" type and are hereinafter identified as "isoalkyl" groups.

The isoalkoxy compounds of the invention are prepared by reacting 2,4-dihydroxybenzophenone with an "oxo" alkyl halide (also called "isoalkyl" halide) of the Formula RX where R is as defined above and X is chlorine, bromine or iodine. Examples of such compounds are "oxo" octyl chloride, "oxo" octyl bromide, "oxo" octyl iodide, "oxo" hexyl chloride, "oxo" decyl chloride, "oxo" heptyl chloride, "oxo" nonyl chloride.

The "oxo" halides are prepared in conventional fashion from the corresponding "oxo" alcohols, e.g. "oxo" octyl alcohol, "oxo" hexyl alcohol, "oxo" decyl alcohol. Such compounds are also known as "isooctanol," "isohexanol" and "isodecanol" and are a mixture of isomeric alcohols made by the "Oxo process." As applied to the "Oxo process" alcohols the term "iso" signifies a mixture of branched chain primary alcohols, see Kirk-Othmer "Encyclopedia of Chemical Technology," 2nd edition, vol. 14, pp. 373–374. A typical commercially available isooctanol has the analysis 3,4-dimethyl-1-hexanol 20%, 3,5-dimethyl - 1 - hexanol 30%, 4,5 - dimethyl - 1 - hexanol 30%, 3 - methyl - 1 - heptanol and 5-methyl-1-heptanol together 15% and unidentified alcohol 5%. A typical commercially available isodecanol is a mixture of a plurality of primary saturated alcohols having ten carbon atoms. There is a major proportion of a mixture of trimethyl heptanols and small amounts of other isomeric primary saturated decanols. Another commercially available isoalkanol is Alphanol 79, a mixture of primary saturated alkanols of 7, 8 and 9 carbon atoms having methyl side chains.

The terms "isoalkyl" and "isoalkoxy" as used in the present specification and claims are used in the manner set forth in the Kirk-Othmer citation to denote the complex mixture of isomers produced as a result of using "oxo" process starting alcohols and halides. In general such mixtures contain at least 10% of at least three different branched chain isomers.

The compounds of the invention are thus 2-hydroxy-4-isohexoxybenzophenone, 2 - hydroxy - 4 - isoheptoxybenzophenone, 2 - hydroxy - 4 - isooctoxybenzophenone, 2 - hydroxy - 4 - isononoxybenzophenone, and 2-hydroxy-4 - isodecoxybenzophenone. Obviously mixtures of such compounds can also be used. All of the isoalkoxy compounds of the present invention are liquids at room temperature and considerably below, e.g. 0° C.

Unless otherwise indicated, all parts and percentages are by weight.

The compounds of the present invention are useful as ultraviolet light stabilizers for polymers, e.g. halogen containing resins (preferably vinyl chloride polymers) and olefin polymers (preferably polypropylene), particularly solid polymers.

As the halogen containing resins there can be used resins made from vinylidene compounds such as vinyl chloride, vinylidene chloride, vinyl chloroacetate, chlorostyrenes, vinyl bromide and chlorobutadienes.

Such vinylidene compounds may be polymerized alone or in admixture with each other or with vinylidene compounds free from halogen. Among the halogen free materials which can be copolymerized with the halogen containing vinylidene compounds, e.g. vinyl chloride, are vinyl esters of carboxylic acids, e.g. vinyl acetates, vinyl propionate, vinyl butyrate and vinyl benzoate, esters of unsaturated acids, e.g., alkyl and alkenyl acrylates such as methyl acrylate, ethyl acrylate, propyl acrylate, butyl acrylate and allyl acrylate as well as the corresponding methacrylates, e.g. methyl methacrylate and butyl methacrylate, vinyl aromatic compounds, e.g. styrene, p-ethyl styrene, divinyl benzene, vinyl naphthalene, α-methyl styrene, p-methyl styrene, dienes such as butadiene and isoprene, unsaturated amides such as acrylamide, methacrylamide and acrylanilide and the esters of α,β-unsaturated carboxylic acids, e.g. the methyl, ethyl, propyl, butyl, amyl, hexyl, heptyl, octyl, allyl, methallyl and phenyl esters of maleic, crotonic, itaconic and fumaric acids and the like. Specific examples of such esters are diethyl maleate, dibutyl maleate and dibutyl fumarate.

The copolymers in which at least 50% of the copolymer is made from a halogen containing vinylidene compound such as vinyl chloride are preferably treated according to the invention.

The stabilizers of the present invention are also effective when intimately mixed with halogen containing resins in which part or all of the halogen is introduced into a preformed resin, e.g. chlorinated polyvinyl acetate, chlorinated polystyrene, chlorinated polyethylene, chlorinated polyvinyl chloride, chlorinated natural and synthetic rubbers and rubber hydrochloride.

Typical examples of copolymers include vinyl chloride-vinyl acetate (95:5 weight ratio), vinyl chloride-vinyl acetate (87:13 weight ratio), vinyl chloride-vinyl acetate-maleic anhydride 86:13:1 weight ratio), vinyl chloride-vinylidene chloride (95:5 weight ratio), vinyl chloride-diethyl fumarate (95:5 weight ratio), vinyl chloride-trichloroethylene (95:5 weight ratio).

The resin, e.g. polyvinyl chloride, can either be plasticized or unplasticized. As the plasticizer there can be employed conventional materials such as dioctyl phthalate, octyl decyl phthalate, tricresyl phosphate, 2-ethylhexyl diphenyl phosphate, dodecyl dicresyl phosphate, tributyl acetyl citrate, dioctyl sebacate, dibutyl sebacate, etc. The plasticizer is used in conventional amount, e.g. 10 to 100 parts for each 100 parts of the vinyl chloride containing resin.

The stabilizers of the present invention are used in an amount of 0.05 to 20 parts, preferably 0.1 to 10 parts per 100 parts of halogen containing resin.

There can also be incorporated 0.1 to 10 parts per 100 parts of the halogen containing resin of a metal salt stabilizer. Thus, there can be used barium, strontium, calcium, cadmium, zinc, lead, tin, magnesium, cobalt, nickel, titanium and aluminum salts of phenols, aromatic carboxylic acids, fatty acids and epoxy fatty acids.

Examples of suitable salts include barium di(nonylphenolate), strontium di(nonylphenolate), strontium di(amylphenolate), barium di(octylphenoate), strontium di(octylphenolate), barium di(nonyl-o-cresolate), lead di(octylphenolate), cadmium-2-ethylhexoate, cadmium laurate, cadmium stearate, zinc caprylate, cadmium caproate, barium stearate, barium 2-ethyl-hexoate, barium laurate, barium ricinoleate, lead stearate, aluminum stearate, magnesium stearate, calcium octoate, calcium stearate, cadmium naphthanate, cadmium benzoate, cadmium p-tert, butylbenzoate, barium octyl salicylate, cadmium epoxy stearate, strontium epoxy stearate, cadmium salt of epoxidized acids of soybean oil, and lead epoxy stearate.

In plastisol formulations, there is preferably also included from 0.1 to 10 parts per 100 parts of resins of an epoxy vegetable oil such as epoxidized soybean oil or epoxidized tall oil.

Also there can be incorporated a phosphite, e.g. an alkyl, aryl or aralkyl phosphite in an amount of 0.1 to 10 parts per 100 parts of resin. Typical of such phosphites are triphenyl phosphite, tris decyl phosphite, decyl diphenyl phosphite, di(p-tert butylphenyl) phenyl phosphite, diphenyl o-cresyl phosphite, trioctyl phosphite, tricresyl phosphite and tribenzyl phosphite.

The compounds of the present invention are also stabilizers for monoolefin polymers such as polyethylene, polypropylene, ethylene propylene copolymers (e.g. 50:50, 80:20 and 20:80), ethylene-monoolefin copolymers wherein the monoolefin has 4–10 carbon atoms and is present in a minor amount, e.g. ethylene-butene-1 copolymer (95:5) and ethylenedecene-1 copolymer (90:10). Furthermore, they can be used to stabilize natural rubber, styrene-butadiene rubber (SBR rubber), e.g. (75% butadiene, 25% styrene) and EPDM rubbers and acrylonitrile-butadiene styrene terpolymers (ABS).

As the EPDM rubber there can be employed many of the commercially available EPDM rubbers. The EPDM rubber normally contains 30 to 70 molar percent (preferably 50 to 60 molar percent) of ethylene, 65 to 20 molar percent (preferably 35 to 45 molar percent propylene) and 1 to 15 molar percent (preferably 3 to 5 molar percent) of the nonconjugated polyolefin. Usually the polyolefin is not over 10 molar percent. The ethylene and propylene can each be 5 to 95 molar percent of the composition.

As used in the present specification and claims the term nonconjugated polyolefin includes aliphatic unconjugated polyene hydrocarbons and cycloaliphatic nonconjugated polyene hydrocarbons, e.g., endocyclic dienes. Specific examples of suitable nonconjugated polyolefins include pentadiene-1,4; hexadiene-1,4; dicyclopentadiene, methyl cyclopentadiene dimer, cyclododecatriene, cyclooctadiene-1,5; 5-methylene-2-norbornene.

Specific examples of suitable terpolymers are the Royalenes which contain 55 mole percent ethylene, 40 to 42 mole percent propylene and 3 to 5 mole percent dicyclopentadiene; Enjay terpolymers, e.g., ERP-404 of Enjay and Enjay 3509 which contains about 55 mole percent ethylene, 41 mole percent propylene and 4 mole percent 5-methylene-2-norbornene; Nordel, a terpolymer of 55 mole percent ethylene, 40 mole percent propylene and 5 mole percent hexadiene-1,4. Another suitable terpolymer is the one containing 50 mole percent ethylene, 47 mole percent propylene and 3 mole percent, 1,5-cyclooctadiene (dutrel).

Examples of EPDM rubbers are given in U.S. Pats. 2,933,480; 3,000,866; 3,063,973; 3,093,620; 3,093,621; and 3,136,739, in British Pat. 880,904 and in Belgian Pat. 623,698.

Terpolymers and other EPDM rubbers from ethylene, propylene and dicyclopentadiene are exemplified in Tarney Pat. 3,000,866; Adamek Pat. 3,136,739 and Dunlop (British) Pat. 880,904. EPDM rubbers from ethylene, propylene and 1,4-hexadiene are exemplified in Gresham Pat. 2,933,480. As in Greshman other suitable nonconjugated diolefins are 1,4-pentadiene; 2-methyl-1,5 hexadiene, 3,3-dimethyl-1, 5-hexadiene, 1,7-octadiene, 1,9-decadiene, 1,19-eicosadiene, 1,9-octadecadiene, 6-methyl-1,5-heptadiene, methyl-1,6-octadiene, 11-ethyl-1,11-tridecadiene.

EPDM rubbers from ethylene, proplyene and 5-methyl-2-norbornene are exemplified in U.S. Pat. 3,093,621. Suitable norbornadienes e.g., 2-methyl norbornadiene, 2-ethyl norbornadiene, 2-n-heptyl norbornadiene are shown in Glading Pat. 3,063,973 and bicyclo compounds such as bicyclo (2,2,2) heptadiene-2,5 are shown in Dunlop (British) Pat. 880,904. The use of cylclooctadiene-1,5 and other cyclodienes is shown in Montecatini (Belgium) Pat. 623,698. Thus there can be used in making the EPDM elastomer 1,4-cycloheptadiene, 1,4-cyclooctadiene, 1,6-cyclodecadiene, 1,5-cyclododecadiene, 1,7-cyclodecadiene, 1,5,9-cyclododecatriene, 1-methyl-1,5-cyclooctadiene.

The compounds of the present invention are normally employed in an amount of at least 0.01% and usually 0.1% to 10% by weight of the polymer they are intended to stabilize.

There can also be included conventional sulfur containing compounds as stabilizers for the olefin polymers. Thus, there can be employed therewith neutral sulfur compounds having a thio linkage beta to a carbon atom having both a hydrogen atom and a carboxyl group attached thereto. Such compounds are used in an amount of 0.01 to 10%, preferably 0.1–5%. Thus there can be used pentaerythritol tetra(mercaptoacetate), 1,1,1 - trimethylolethane tri(mercaptoacetate), 1,1,1-trimethylolpropane tri(mercaptoacetate), dioleyl thiodiproprionate, dilauryl thiodipropionate, other thio compounds include distearyl 3,3'-thiodipropionate, dicyclohexyl-3,3'-thiodipropionate, dicetyl-3,3'-thiodipropionate, dioctyl-3,3'-thiodipropionate, dibenzyl-3,3'-thiodipropionate, lauryl myristyl-3,3'-thiodipropionate, diphenyl-3,3'-thiodipropionate, di-p-methoxyphenyl-3,3'-thiodipropionate, didecyl-3,3'-thiodipropionate, dibenzyl-3,3'-thiodipropionate, diethyl-3,3'-thiodipropionate, lauryl ester of 3-methylmercapto propionic acid, lauryl ester of 3-butyl-mercapto proprionic acid, lauryl ester of 3-laurylmercaptopropionic acid, phenyl ester of 3-octylmercapto propionic acid, lauryl ester of 3-phenylmercapto propionic acid, lauryl ester of 3-benzylmercapto propionic acid, lauryl ester of 3-(p- methoxy) phenylmercapto propionic acid, lauryl ester of 3-cyclohexymercapto propionic acid, lauryl ester of 3-hydroxymethylmercapto propionic acid, myristyl ester of 3-hydroxyethylmercapto propionic acid, octyl ester of 3-methoxymethylmercapto propionic acid, dilauryl ester of 3-hydroxymethylmercapto propionic acid, myristyl ester of 3-hydroxyethylmercapto propionic acid, octyl ester of 3-methoxymethylmercapto propionic acid, dilauryl ester of 3-carboxylmethylmercapto propionic acid, dilauryl ester of 3-carboxypropylmercapto propionic acid, dilauryl-4,7-dithiasebacate, dilauryl-4,7,8,11-tetrathiotetradecandioate, dimyristyl-4,11-dithiatetradecandioate lauryl-3-benzothiazyl-mercaptopropionate. Preferably the esterifying alcohol is an alkanol having 10 to 18 carbon atoms. Other esters of beta thiocarboxylic acids set forth in Gribbins Pat. 2,519,744 can also be used.

Other esters beta thiocarboxylic acids include stearyl (1,2-dicarboethoxyethylthio) acetate, stearyl (1,2-dicarbolauryloxyethylthio) acetate or the like. Compounds of this type can be made by addition of an alkyl ester of mercaptoacetic aci to a dialkyl ester of maleic acid. Similar beta thiocarboxyl compounds can be used which are made by addition of an RSH compound across the maleic ester double bond and where R is alkyl, aryl, alkylcarboxyalkyl, arylcarboxyalkyl or aralkyl. Examples of such compounds are decylthiodilauryl maleate, phenylthiodioctyl maleate, cetyl (1,2-dicarboethoxyethylthio) propionate and benzylthiodimyristyl maleate.

Similarly useful beta thiocarboxyl synergistic compounds can be prepared by addition of the RSH (mercaptan) compounds as defined above across the double bond of dialkyl itaconates, citraconates, fumarates or trialkyl aconitates, e.g. the addition product of lauryl mercaptan with dibutyl itaconate, the addition product of the stearyl ester of mercaptoacetic acid with dilauryl itaconate, the addition product of butyl mercaptan with dilauryl citraconate, the addition product of lauryl mercaptan with tributyl aconitate, the addition product of the lauryl ester of mercaptopropionic acid with triethyl aconitate.

The thermal stability of the polypropylene and other monoolefin polymer is adversely affected by impurities including residual catalyst. When thermal stability is important in addition to ultraviolet light and oxidative stability it has been found valuable to include polyvalent metal salts of fatty acids in an amount of 0.01–10% preferably 0.1–5%, in the monoolefin polymer formulations. Examples of such salts are calcium stearate, calcium 2-ethylhexoate, calcium octate, calcium oleate, calcium ricinoleate, calcium myristate, calcium palmitate, calcium laurate, barium laurate, barium stearate, magnesium stearate as well as zinc stearate, cadmium laurate, cadmium octoate, cadmium stearate and the other polyvalent metal salts of fatty acids set forth previously.

There can also be added phenolic antioxidants in an amount of 0.01–10%, preferably 0.1–5%. Examples of such phenols include 2,6-di-t-butyl-p-cresol, butylated hydroxyanisole, propyl gallate, 4,4' - thiobis(6-t-butyl-m-cresol), 4,4'-cyclohexylidene diphenol, 2,5-di-t-amyl hydroquinone, 4,4'-butylidene bis (6-t-butyl-m-cresol), hydroquinone monobenzyl ether, 2,2' - methylene - bis(4-methyl-6-t-butylphenol), 2,6 - di - butyl-4-decyloxyphenol, 2-t-butyl-4-dodecyloxyphenol, 2 - t - butyl-4-octadecyloxyphenol, 4,4' - methylene-bis(2,6-t-butylphenol), p-aminophenol, N-lauryloxy-p-aminophenol, 4,4'-thiobis(3-methyl-6-t-butylphenol), bis[o-(1,1,3,3-tetramethylbutyl) phenol] sulfide, 4-acetyl-B-resorcylic acid, A stage p-t-butylphenolformaldehyde resin, 4-dodecyloxy-2-hydroxybenzophenone, 3-hydroxy-4-(phenylcarbonyl) phenyl palmitate, n-dodecyl ester of 3-hydroxy-4-(phenylcarbonyl) phenoxyacetic acid, and t-butylphenol as well as those shown in Belgian Pat. 710,873 and French Pat. 1,536,020.

The use of epoxy compounds in an amount of 0.01–5% in the polymer compositions is also valuable. Examples of such epoxy compounds include epoxidized soya bean oil, epoxidized lard oil, epoxidized olive oil, epoxidized linseed oil, epoxidized castor oil, epoxidized peanut oil, epoxidized corn oil, epoxidized tung oil, epoxidized cottonseed oil, epichlorhydrinbisphenol A resins (epichlorohydrindiphenylolpropane resins), phenoxy-propylene oxide, butoxypropylene oxide, epoxidized neopentylene oleate, glycidyl epoxystearate, epoxidized α-olefins, epoxidized glycidyl soyate, dicyclopentadiene dioxide, epoxidized butyl tallate, styrene oxide, dipentene dioxide, glycidol, vinyl cyclohexene dioxide, glycidyl ether of resorcinol, glycidol ether of hydroquinone, glycidyl ether of 1,5-dihydroxynaphthalene, epoxidized linseed oil fatty acids, allyl glycidyl ether, butyl glycidyl ether, cyclohexane oxide, 4-(2,3-epoxypropoxy) acetophenone, mesityl oxide epoxide, 2-ethyl-3-propyl glycidamide, glycidyl ethers of glycerine, pentaerythritol and sorbitol, and 3,4-epoxycyclohexane-1,1-dimethanol bis-9,10-epoxystearate.

The compound of the present invention can also be employed in conjunction with phosphites and thiophosphites as antioxidants and stabilizers for olefin polymers. The phosphite or thiophosphite is employed in an amount of 0.01 to 10% of the polymer (or other material) being stabilized. Thus there can be employed tristearyl phosphite, trilauryl trithiophonphite, trilauryl phosphite or any of the phosphites or thiophosphites in Friedman Patent 3,039,993, Friedman Patent 3,047,608, Friedman Patent 3,053,878 or Larrison Patent 3,341,629.

The liquid 2-hydroxy-4-isoalkoxybenzophenones of the present invention have numerous advantages over the solid 2-hydroxy-4-alkoxybenzophenone ultraviolet light stabilizers.

(1) They can be handled as liquids.
(2) They have greater solubility in most solvents and plasticizers.
(3) They can be manufactured in higher yields.
(4) They have greater compatibility with most resins and hence are less subject to blooming and exudation.
(5) They are less subject to water extraction from plastics due to this greater compatibility.
(6) They give superior performance in some resins due to greater compatibility.

EXAMPLE 1

"Oxo" 4-octoxy-2-hydroxybenzophenone (4-isooctoxy-2-hydroxybenzophenone)

Reagents:
2,4-dihydroxybenzophenone—1 mole
Sodium iodide—0.1 mole
"Oxo" octyl chloride (isooctyl chloride)—1.2 moles
Acetone—1000 ml.
Sodium carbonate—1.2 moles The reagents were added to a suitable pressure vessel and heated at 150° C. for a total of 4 hours with mechanical agitation. At the end of this period the mixture was transferred to a suitable vessel and the major part of the acetone was stripped for reuse. The residue was drowned in 4 liters of water and the upper layer was separated, transferred to a distillation flask and distilled. The distillate coming over between 220–225° C. at 1 mm. was collected. A small forerun was discarded. The yield of product was 0.97 mole (97%). ( In contrast German Pat. 1,806,870 shows a maximum yield of 59% of 4-n-octoxy-2-hydroxybenzophenone.)

The physical properties of the isooctoxy product of Example 1 compared to the n-octoxy isomer are set forth in Table 1.

TABLE 1

| Typical properties | Isooctoxy | n-Octoxy |
|---|---|---|
| Form | (1) | (2) |
| Molecular weight | 326 | 326 |
| Solidification point, °C | (3) | 48 |
| Pour point, °C | −15 | |
| Specific gravity, 24° C | 1.064 | 1.160 |
| Refractive index, 25° C | 1.5746 | |
| Color, percent transmission at 440 mμ (10% toluene solution) | 50–54 | 55–60 |
| Color, Gardner | 8+ | 4 8 |
| Volatiles, percent | 0.05 | 0.05 |
| Water, percent | Nil | Nil |
| Toluene insolubles (10% conc.) | Nil | 0.03 |

[1] Pale yellow liquid.
[2] Off white crystalline powder.
[3] Clear glass at −20° C.
[4] Molten.

4-isohexoxy-2-hydroxybenzophenone was prepared in similar manner by replacing the isooctyl chloride in example 1 by 1.2 moles of isohexyl chloride and 4-isodecoxy-2-4-hydroxybenzophenone was prepared by replacing the isooctyl chloride in Example 1 by 1.2 moles of isodecyl chloride.

EXAMPLE 2

The ultraviolet stabilizing properties of 4-isooctoxy-2-hydroxybenzopheone was tested in an impact modified polyvinyl chloride in both a clear and pigmented formulation.

The test recipes were as follows:

| | A | B |
|---|---|---|
| Geon 103 EP (polyvinyl chloride), parts | 100 | 100 |
| K-120N (acrylic modifier) | 3 | 3 |
| Kane Ace B-12 (acrylic modifier) | 15 | 15 |
| Adavawax 135 (distearyl azelate) | 0.75 | 0.75 |
| TM-180 (dibutyltin isoocytl thioglycolate) | 2 | 2 |
| $TiO_2$ | | 10 |
| 4-isooctoxy-2-hydroxybenzophenone | 0.5 | 0.5 |

The test was run over a period of 200 hours of ultraviolet light exposure with a General Electric quartz lamp using a National Starch Accelerometer. At the end of the 200-hour period, both the clear and pigmented formulations showed less coloring than controls omitting the isooctoxy compound. They were also superior to similar compositions using 0.5 part of 4-n-octoxy-2-hydroxybenzophenone as the ultraviolet light stabilizer.

EXAMPLE 3

The procedure of Example 2 was repeated but the K-120N and the Kane ACB-12 were omitted to give a polyvinyl chloride composition which was not impact modified. The isooctoxy-2-hydroxybenzophenone was also an effective ultraviolet light stabilizer in such formulations both clear and pigmented.

EXAMPLE 4

4-isooctoxy-2-hydroxybenzophenone was compared with 4-n-octoxy-2-hydroxybenzophenone as ultraviolet stabilizers in polypropylene. The compositions and results are set forth in Tables 2 and 3.

TABLE 2

| | A | B |
|---|---|---|
| Polypropylene, parts | 100 | 100 |
| DSTDP (distearyl thiodipropionate) | 0.3 | 0.3 |
| Irganox 1010 (tetrakis ester of 4-hydroxy-2,6-di-t-butylphenyl propionic acid with pentaerythritol) | 0.1 | 0.1 |
| 4-isooctoxy-2-hydroxybenzophenone | 0.5 | |
| 4-n-octoxy-2-hydroxybenzophenone | | 0.5 |
| Weather-Ometer test,[1] hrs | 325 | 300 |
| Appearance at end of test | Colorless | [2] |

[1] The hours are hours to failure as judged by the flex test.
[2] Irregular yellow.

TABLE 3

The same formulations were used as in Table 2 but after boiling in water for 7 days.

| | A | B |
|---|---|---|
| Weather-Ometer test | 200 hours | 180 hours |
| Appearance | Slight yellow | Slight yellow |

These "oxo" benzophenones can also be used with any of the conventional nickel chelates such as nickel acetyl acetonate, 2,2'-thio bis(4-t-octylphenolato) n-butylamine nickel (II), and other nickel compounds. These nickel compounds are believed to be carbonyl oxygen triplet quenchers and are useful as ultraviolet stabilizers particularly in the presence of the "oxo" benzophenones of the present invention. A typical formulation is as follows:

EXAMPLE 5

| | Parts |
|---|---|
| Polypropylene | 100 |
| 2,2-thiobis(4-t-octylphenolato)-n-butylamine Nickel (II) | 0.25 |
| 4-"oxo" oxtyl-2-hydroxybenzophenone | 0.25 |
| Distearylthiodipropionate | 0.3 |
| Pentaerythritol tetrakis (4-hydroxy-2,6-di-t-butylphenylpropionate) | 0.1 |

These ingredients were mixed with the polypropylene and milled into a 20 mil film in the conventional manner.

This combination lasted 600 hours in the Weather-Ometer before deterioration.

What is claimed is:

1. 2-hydroxy-4-isoalkoxybenzophenone having 6 to 10 carbon atoms in the isoalkoxy group, said product being a liquid at room temperature, the isoalkoxy group containing a mixture of branched chain groups produced by the oxo process.

2. A product according to claim 1 which is liquid at temperatures at least as low as 0° C.

3. A product according to claim 2 which is 2-hydroxy-4-isooctoxybenzophenone.

References Cited
UNITED STATES PATENTS 2,853,521  9/1958  Hardy et al. _____ 260—591
3,014,908  12/1967  Coleman et al. _____260—591

DANIEL D. HORWITZ, Primary Examiner

U.S. Cl. X.R.

260—45.95